United States Patent
Lachner et al.

(10) Patent No.: US 7,873,403 B2
(45) Date of Patent: Jan. 18, 2011

(54) METHOD AND DEVICE FOR DETERMINING A THREE-DIMENSIONAL FORM OF A BODY FROM TWO-DIMENSIONAL PROJECTION IMAGES

(75) Inventors: Rainer Lachner, Poing/Angelbrechting (DE); Thomas Feilkas, Grafing (DE); Falko Seifferth, Zorneding (DE); Stefan Vilsmeier, Kufstein (DE)

(73) Assignee: BrainLAB AG, Feldkirchen (DE)

( * ) Notice: Subject to any disclaimer, the term of this patent is extended or adjusted under 35 U.S.C. 154(b) by 1795 days.

(21) Appl. No.: 10/889,774

(22) Filed: Jul. 13, 2004

(65) Prior Publication Data

US 2005/0015003 A1    Jan. 20, 2005

Related U.S. Application Data

(60) Provisional application No. 60/492,715, filed on Aug. 5, 2003.

(30) Foreign Application Priority Data

Jul. 15, 2003    (EP)    ................... 03015607

(51) Int. Cl.
- *A61B 5/05* (2006.01)
- *G06K 9/00* (2006.01)
- *G06T 17/00* (2006.01)

(52) U.S. Cl. ............... 600/425; 600/426; 600/407; 382/128; 345/420

(58) Field of Classification Search ........ 600/425, 600/426
See application file for complete search history.

(56) References Cited

U.S. PATENT DOCUMENTS

| | | | |
|---|---|---|---|
| 4,791,934 A | 12/1988 | Brunnett | |
| 4,821,214 A * | 4/1989 | Sederberg | 345/420 |
| 5,699,799 A * | 12/1997 | Xu et al. | 600/407 |
| 5,734,739 A * | 3/1998 | Sheehan et al. | 382/128 |
| 5,772,594 A | 6/1998 | Barrick | |

(Continued)

FOREIGN PATENT DOCUMENTS

DE    100 37 491    2/2002

(Continued)

OTHER PUBLICATIONS

Duncan, James S. Medical Image Analysis Using Model-Based Optimization. IEEE, 370-377: 1999.*

(Continued)

*Primary Examiner*—Eric F Winakur
*Assistant Examiner*—Helene Bor
(74) *Attorney, Agent, or Firm*—Renner, Otto, Boisselle & Sklar, LLP

(57) ABSTRACT

A method for determining a three-dimensional form of a body from two-dimensional projection images includes producing at least one projection image of the body and producing corresponding model projection images from a generic model of the body. The body projection images and the model can be input into a computer-assisted processing unit and the generic model can be adjusted to the body by comparing image contents of the body projection images with the model projections images at a two-dimensional level only. The three-dimensional form of the body can be determined from the adjusted generic model.

16 Claims, 2 Drawing Sheets

U.S. PATENT DOCUMENTS

| | | | |
|---|---|---|---|
| 5,784,431 A | 7/1998 | Kalend et al. | |
| 5,799,055 A * | 8/1998 | Peshkin et al. | 378/42 |
| 5,813,984 A * | 9/1998 | Haaga et al. | 600/410 |
| 5,926,568 A * | 7/1999 | Chaney et al. | 382/217 |
| 5,967,982 A | 10/1999 | Barnett | |
| 6,236,875 B1 * | 5/2001 | Bucholz et al. | 600/407 |
| 6,393,090 B1 * | 5/2002 | Hsieh et al. | 378/4 |
| 6,574,500 B2 * | 6/2003 | Keren | 600/431 |
| 6,711,432 B1 * | 3/2004 | Krause et al. | 600/427 |
| 6,728,567 B2 * | 4/2004 | Rather et al. | 600/407 |
| 6,754,522 B2 * | 6/2004 | Keren | 600/431 |
| 6,898,303 B2 * | 5/2005 | Armato et al. | 382/131 |
| 7,200,251 B2 * | 4/2007 | Joshi et al. | 382/128 |
| 2001/0034480 A1 * | 10/2001 | Rasche et al. | 600/407 |
| 2003/0056799 A1 * | 3/2003 | Young et al. | 128/922 |
| 2003/0181809 A1 * | 9/2003 | Hall et al. | 600/425 |
| 2003/0185346 A1 | 10/2003 | Vilsmeier | |
| 2004/0082849 A1 * | 4/2004 | Schweikard et al. | 600/424 |
| 2004/0215071 A1 * | 10/2004 | Frank et al. | 600/407 |
| 2005/0004451 A1 * | 1/2005 | Vilsmeier et al. | 600/426 |
| 2006/0023927 A1 * | 2/2006 | Zhang et al. | 382/131 |
| 2006/0025681 A1 * | 2/2006 | Abovitz et al. | 600/425 |
| 2006/0094951 A1 * | 5/2006 | Dean et al. | 600/407 |
| 2007/0106146 A1 * | 5/2007 | Altmann et al. | 600/407 |

FOREIGN PATENT DOCUMENTS

| | | |
|---|---|---|
| EP | 1 262 914 A1 | 12/2002 |
| EP | 1 348 394 A1 | 10/2003 |
| WO | 99/59106 | 11/1999 |
| WO | 01/22368 | 3/2001 |
| WO | 01/22368 A1 | 3/2001 |

OTHER PUBLICATIONS

Horace H.S. Ip and Li-Jun Yin, Arbitrary Facial Views Generation From Two Orthogonal Facial Images, Oct. 1995, pp. 1079-1084.

Ana C. Andres del Valle and Jorn Ostermann, 3D Talking Head Customization by Adaptating a Generic Model to One Uncalibrated Picture, May 2001, pp. 325-328.

Won-Sock Lee et al.; MPEG-4 Compatible Faces from Orthogonal Photos, May 1999, pp. 186-194.

* cited by examiner

METHOD AND DEVICE FOR DETERMINING A THREE-DIMENSIONAL FORM OF A BODY FROM TWO-DIMENSIONAL PROJECTION IMAGES

RELATED APPLICATION DATA

This application claims priority of U.S. Provisional Application No. 60/492,715, filed on Aug. 5, 2003, which is incorporated herein by reference in its entirety.

FIELD OF THE INVENTION

The present invention relates generally to the field of image production for anatomical structures in order to visually support medical and/or surgical operations. It finds particular application in conjunction with determining a three-dimensional form of a body or anatomical structure from two-dimensional projection images.

BACKGROUND OF THE INVENTION

Computer-assisted, stereotactic systems, which operate with the aid of body structure data obtained from tomographic detection systems and with the assistance of x-ray images produced in situ, are known, for example, from U.S. Pat. Nos. 4,791,934 and 5,799,055. Supporting an operation using x-ray image recordings is discussed, for example, in U.S. Pat. Nos. 5,967,982, 5,772,594 and 5,784,431.

Even if accurate medical navigation is provided, the current prior art still operates with the aid of body structure data originating, for example, from tomographic detection systems, such as computer tomography devices or nuclear spin tomography devices. The patient to be treated is thus positionally registered in situ with respect to the previously ascertained image data. Operating instruments are then virtually displayed in the same relation to the image data as to the actual patient, in order to make the body structure data or possibly also x-ray image data useful to the surgeon in the operating theater.

One drawback of such methods, in which tomographic recordings (CT, MR) or x-ray images are produced especially for navigation within the context of a treatment, is the radiation load on the patient. Another drawback is the high cost, since such devices are very expensive both to purchase and to maintain and operate.

Attempts have been made to develop systems that may be used without body structure data captured separately in advance, for example, on the basis of statistical models of image data sets for body structure. However, such systems lack the required accuracy for the patient to be treated in each case.

DE 100 37 491 A1 and WO 99/59106 describe methods for providing 3-D information with the aid of fluoro-recordings. The starting point in all the methods is that of producing transillumination recordings of the patient, and/or the desired structure. A localization system is typically used for this, in order to obtain spatial information with the recordings. DE 100 37 491 A1 initially uses two fluoro-images, from which to reconstruct a rough 3-D model. Further recordings from different angles are used to specify the model even more exactly. In accordance with WO 99/59106, at least three fluoro-recordings of the patient are generally made. These can include anterior-posterior, lateral, and anterior-posterior with the head inclined back. In addition to the transillumination recordings, photographs of the patient are also used. In this prior art method, the model is elaborately adjusted in three-dimensional space.

A technique is known from WO 01/22368, using which a three-dimensional model is reconstructed using fluoroscopy images. The basis for this is a statistical model of the desired structure and at least one fluoroscopy image. The idea is to first position the model using the back-projected contours of the structure, such as are to be found in the fluoroscopy images. The model is then deformed and the contours of the deformed model are compared with the contours found in the fluoroscopy image. The quality of match is determined by calculating the error in the difference between the model contour and the fluoroscopy image contour. The two steps are repeatedly performed, i.e. the model is positioned and "morphed" until a good match is found.

One drawback of this method is that the degree of match between the model and the fluoroscopy image data is determined in the three-dimensional space, which includes the model. Such calculations are very complicated and time-consuming, which compromises its practical application. Furthermore, accuracy suffers from the fact that this method only uses a few features of the fluoroscopy images, namely only the contour lines.

SUMMARY OF THE INVENTION

In accordance with one aspect of the present invention, the invention is directed to a method for determining a three-dimensional form of an anatomical body from two-dimensional projection images. The method can include producing at least one projection image of the body and producing corresponding model projection images from a generic model of the body. The body projection images and the model projection images from the generic body model can be input into a computer-assisted processing unit and the generic model can be adjusted to the body. The three-dimensional form of the body can be determined from the adjusted generic model.

In accordance with another aspect of the invention, the invention is directed to a device for determining a three-dimensional form of a body from two-dimensional projection images. The device can include an image forming device, which produces at least one projection image of the body, and a computer-assisted data and/or image processing device, which produces model projection images corresponding to the body projection images from a generic model of the body. The body projection images and the model projection images can be input into the data and/or image processing device using a data transfer means. The data and/or image processing device can include a component for adjusting the generic model to the body, wherein the form and, if necessary, the position of the generic model is adjusted, and wherein the match between the generic model and the body is determined at the two-dimensional level by comparing the image contents of the body projection images with the model projection images. The data and/or image processing device can also include a component for determining the three-dimensional form of the body from the adjusted generic model.

BRIEF DESCRIPTION OF THE DRAWINGS

These and further features of the present invention will be apparent with reference to the following description and drawings, wherein.

DETAILED DESCRIPTION OF THE INVENTION

Figure 1:
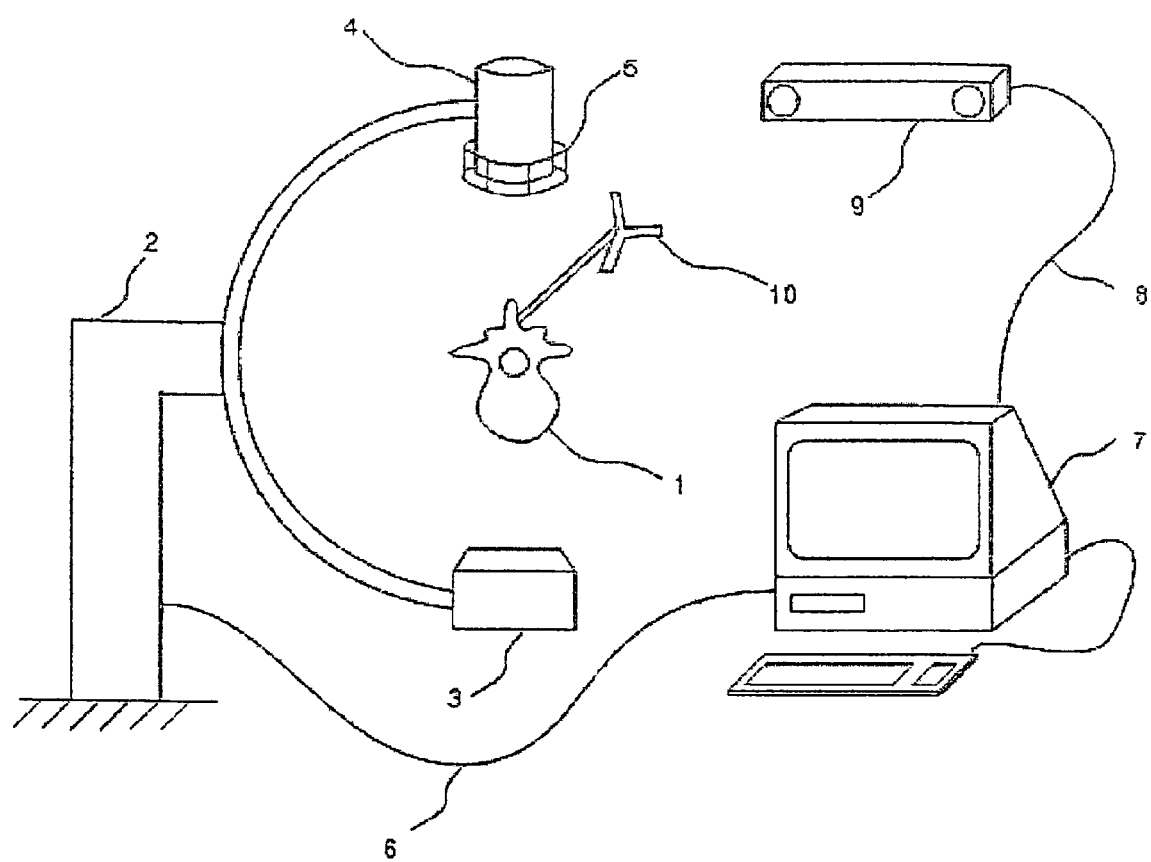
FIG. 1 is a schematic representation of a device for determining a three-dimensional form of an anatomical body from two-dimensional projection images in accordance with the invention.

In accordance with one aspect of the present invention, the invention is directed to a method for determining a three-dimensional form of an anatomical body or structure from two-dimensional projection images. The method can include producing at least one projection image of the body and producing corresponding model projection images from a generic model of the body. The method can further include producing a generic model of the body and inputting the body projection images and the generic model into a computer-assisted processing unit. The generic model can be adjusted to the body, wherein the form and, if necessary, the position of the generic model can be adjusted. The match between the generic model and the body is only determined at the two-dimensional level, for example, by comparing the image contents of the body projection images with the model projection images. The three-dimensional form of the body is determined from the adjusted generic model.

The match between the generic model and the body can be assessed at the two-dimensional level. When model projection images, which are two-dimensional in nature, are produced from a generic body model, these can be produced very quickly using appropriate hardware or software. In addition, comparing the model projection images to the likewise two-dimensional body projection images can be optimized for time and calculation efficiency. This can lead to a result far more quickly than with reconstructing and/or comparing matches in three-dimensional space. Furthermore, less expensive hardware can be used.

The body projection images can be x-ray images. The model projection images can be reconstructed projection images, such as digitally reconstructed x-ray images (digitally reconstructed radiographs=DRRs), which originate from volume or surface data sets for the model. The respective properties and advantages of using volume or surface data sets for the model are explained in even more detail in the following.

In accordance with one embodiment of the invention, comparing the image contents of the body projection images and the model projection images includes comparing outer contours of the projection images and/or features of the projection images within the outer contours. Comparing the image contents of the body projection images and the model projection images can include comparing depth information in the projection images. By using the image contents listed above when adjusting the generic model, it is possible to achieve a better match with the actual body and/or actual anatomical structure. The features in the interior of the contour and/or the depth information contain additional criteria. The invention recognizes that projection images provide, not only data in one incision plane, such as, for example contour data, but also comprise additional information on the "depth," which can be used to optimize adjusting the generic model. Nonetheless, the image contents can be adjusted and compared at the two-dimensional level, which, in practice, allows a far quicker solution.

In accordance with one embodiment of the invention, the projection parameters of the body projection images are determined when producing the body projection images. This can be accomplished by means of a tracking system for the body and a recording device for the body projection images in order to produce the corresponding model projection images. Such tracking systems or navigation systems can be (optically based) patient and device tracking systems, such as are understood by skilled artisans.

In accordance with one embodiment, the generic model can be adjusted by way of statistical deformation. It can also be adjusted at least partially interactively with the aid of user inputs, wherein a free-form deformation model is used.

For producing corresponding model projection images, a generic surface data set model can be used, whose data can then be used when adjusting the model. Alternatively, a generic volume data set model can be used. Also, surface data set models and volume data set models can be used as alternatives or together without departing from the scope of the present invention.

According to another aspect of the invention, the invention is directed to a device for determining a three-dimensional form of an anatomical body from two-dimensional projection images. The device can include an image forming device and a computer-assisted data and/or image processing device, wherein the computer-assisted data and/or image processing device can include components, such as hardware or software components, which perform one or more steps of the method described above.

FIG. 1 shows a schematic representation of a device for determining a three-dimensional form of an anatomical body or structure from two-dimensional projection images.

In one embodiment, a (digital) x-ray recording can be taken of an actual body structure, for example, a vertebra 1. A reference element 10 can be situated on the vertebra 1, using which the spatial position of the vertebra 1 can be detected by a tracking system and/or a medical navigation system. Such a navigation or tracking system is described more fully in co-owned U.S. Pat. No. 6,351,659, which is incorporated herein by reference in its entirety. The tracking system is schematically shown by a camera array 9 connected to a data or image processing device 7 via a data line 8. The data or image processing device 7 is schematically shown here as a computer. A mobile or stationary image forming device, such as a C-arc x-ray device, is indicated by the reference numeral 2. The mobile or stationary image forming device 2 can include a radiation source 3 and, at the other end of the C-arc, an image intensifier 4, which likewise bears a reference element 5, which adds positional information to the recorded images. The image data can be transmitted to the computer 7 via the data line 6.

The computer 7 can include, among other things, image processing hardware/software, a CPU and data memories and a screen output. The computer 7 can also store the data of the generic model, which is to be adjusted by means of the x-ray images produced by the x-ray device 2, in order to determine the three-dimensional form of the vertebra 1.

Figure 2:
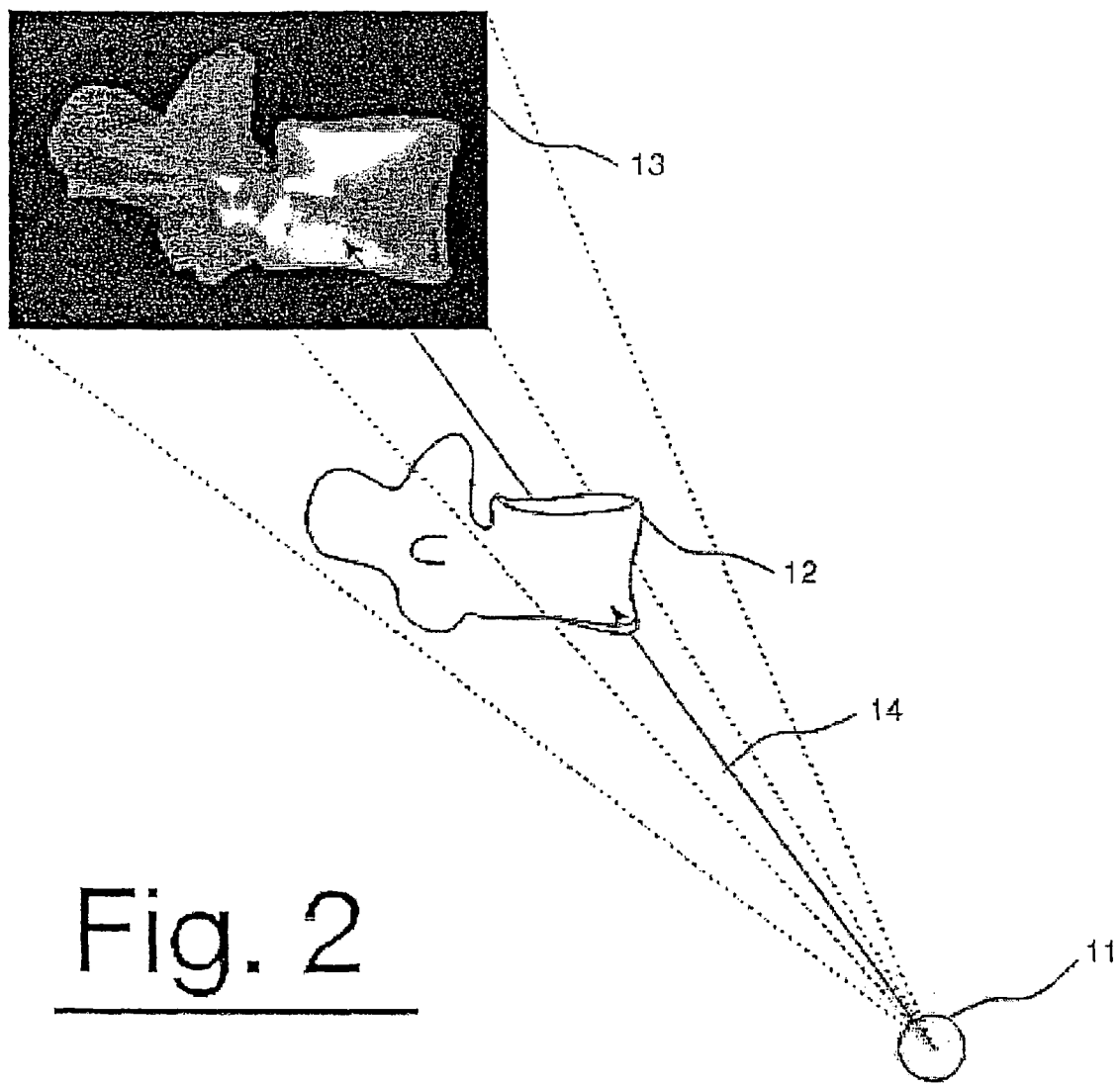
FIG. 2 is an exemplary schematic diagram for a digitally reconstructed x-ray image used in conjunction with the present invention.

For determining the three-dimensional form of a body structure in this way, digitally reconstructed x-ray images can be produced, which correspond to the x-ray images produced by the x-ray device 2. The navigation and/or tracking system can ensure that the x-ray images of the vertebra 1 exhibit the same projection parameters (for example, location of the radiation source, location of the image intensifier, radiation parameters) as the digitally reconstructed x-ray images (DRRs). FIG. 2 schematically shows such a DRR being produced. Irradiating the vertebra 12 from the generic model is simulated in the computer by means of a virtual radiation source 11. The model can be a surface model or a volume model. Using the radiation path, shown as dotted lines, a digitally reconstructed x-ray image 13 can be created. The reference numeral 14 indicates a sample beam, which passes through the model. Using such a beam and/or using the sum of such beams, depth information in the DRR as well as information on features within the contours of the model can also be obtained.

In accordance with one embodiment of the invention, a three-dimensional form can be predicted and/or determined from the information of a plurality of two-dimensional projection images, for example, from at least one fluoroscopy image. In this way, a "model" of the observed form or structure (for example, a femur or a vertebra) is generated. This model can include statistical knowledge on variations in the form in a cross-section through a number of samples. However, this is not absolutely necessary. The form can be represented either by a surface data set or, if more exact details of the inner structure are also important, by a volume data set, or by a combination of both. In any event, a "generic form" of the structure of interest is provided.

Changes to the form then can be coded in, for example, by (changing) a few form parameters. These form parameters can be, for example, the types of variation of a dot distribution model. They can also be node positions of free-form deformation boxes, which include the form.

Furthermore, the images are at least roughly calibrated. The projection parameters have to be known partially or entirely. This is enabled using image data, which may be determined in its spatial position via an image tracking system.

Once the body projection images have been produced and it has been possible to obtain corresponding model projection images from the generic model, the generic model is moved to a suitable starting position, whereupon the body projection images (e.g., fluoroscopic images) are compared with the model projection images (e.g., DRRs) rendered from the generic model. The position of the model is, if necessary, corrected (i.e., the DRRs and the fluoroscopy images are assimilated to each other by rotating and shifting). A further step includes correcting the model form, wherein the DRRs and the fluoroscopy images are further assimilated to each other by changing one or more of the form parameters. The DRRs can be generated either software-based or hardware-based, if the generic model consists of a volume data set. If the model consists of a surface data set, then a DRR-like image can quickly be rendered, wherein the surface models are rendered as DRR images on standard graphic hardware.

The position and form can be corrected for the model either manually or automatically. Furthermore, they can be corrected either in sequence, in succession or in combination (simultaneously).

One aspect of the invention also allows switching between surface model processing and volume model processing at any time during processing. For example, the first part of adjusting could be performed using the quicker surface model. Once a sufficient accuracy has been achieved, the result can be improved using the volume data. If an interactive mode is desired, the surface model would arguably be the better choice, and the resultant deformation can then be applied to the volume data.

Deforming a statistical model purely intuitively is difficult to perform. To overcome this problem, an approach can be chosen in which a free-form deformation is used, in order to deform the model interactively or automatically. This deformation can be converted into statistical deformation information, which allows switching between statistically-based deformation and a free-form deformation at any time. One advantage here is that the user could prepare an initial deformation using intuitive free-form deformations, and the initial deformation can then be used as a starting point for statistical, automatic adjusting. Means can also be provided to improve the results of the automatic adjustment method, subsequently or at any time in the adjustment process.

DRRs generated from the model are used and compared to fluoroscopy images. This results in better adjusting, since the depth information in the fluoroscopy images can also be used. If this additional information is ignored, more images may be needed, since the contours alone do not necessarily provide enough information (depending on the angle of the fluoroscopy images and the structure in question).

The model can be assimilated to the fluoroscopy images automatically. This includes "morphing" the model and correctly positioning it. Landmarks can be detected or manually positioned, and the resulting model can be subjected to fine-tuning by using automatic registering and a morphing algorithm. It is also possible to only use DRR-fluoroscopy assimilation, in order to morph and position the model without the user intervening.

There are DRR reconstruction methods that use a tetrahedron approach in order to model the volume data. The individual tetrahedrons are used to represent the various types of bone structures. The idea is to reduce the quantity of data necessary to display the volume while still providing the same information. This idea can also be implemented in accordance with the invention.

Otherwise, the different bone densities can be approximated in the surface model, using different layers. One advantage of this is that everything can be morphed and rendered using conventional graphics cards, without special processing requirements. The additional layers, needed to make the surface model more exact, can be automatically generated by segmenting additional iso-surfaces or also by scaling the model.

The methodology described herein enables the form to be determined in accordance with practice, with a reasonable input of time and calculating, and provides a better adjusted model than has hitherto been possible.

It is to be appreciated that the method and the device described herein can include any of the features described therein, individually or in any combination.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, systems, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for determining a three-dimensional form of an anatomical body from two-dimensional projection images, said method comprising:
   producing at least one projection image of the body;
   producing corresponding model projection images from a generic model of the body;
   comparing the at least one body projection image and the model projection images from the generic body model;

adjusting the generic model to the body based on the comparing of the at least one body projection image and the model projection images;
determining the three-dimensional form of the body from the adjusted generic model;
wherein adjusting the generic model to the body includes comparing image contents of the at least one body projection image with the model projection images, and
wherein comparing the image contents of the at least one body projection image and the model projection images includes comparing (i) outer contours of the projection images and (ii) depth information in the projection images, wherein depth information includes features in the interior of the outer contours of the projection images.

2. The method as set forth in claim 1, wherein adjusting the generic model to the body includes adjusting the form and/or the position of the generic model.

3. The method as set forth in claim 1, wherein comparing image contents of the at least one body projection image with the model projection images is determined at only a two-dimensional level.

4. The method as set forth in claim 1, wherein the at least one body projection image is an x-ray image.

5. The method as set forth in claim 4, wherein the model projection images are digitally reconstructed x-ray images which originate from volume or surface data sets for the model.

6. The method as set forth in claim 1, wherein producing the model projection images includes determining projection parameters of the at least one body projection image while producing the at least one body projection image.

7. The method as set forth in claim 6, wherein the projection parameters are determined using a tracking system for the body and a recording device for the at least one body projection image.

8. The method as set forth in claim 1, wherein the generic model is automatically adjusted by way of statistical deformation.

9. The method as set forth in claim 1, wherein the generic model is adjusted at least partially interactively with the aid of user inputs, wherein a free-form deformation model is used.

10. The method as set forth in claim 1, wherein a generic surface data set model is used for producing corresponding model projection images, data from the generic surface data set model being used when adjusting the model.

11. The method as set forth in claim 1, wherein a generic volume data set model is used for producing corresponding model projection images, data from the generic volume data set model being used when adjusting the model.

12. The method as set forth in claim 1, wherein a generic volume data set model and a generic surface data set model are used together or alternatively for producing corresponding model projection images, data from the generic volume data set model and the generic surface data set model being used when adjusting the model.

13. A method for determining a three-dimensional form of an anatomical body from two-dimensional projection images, said method comprising:
producing at least one projection image of the body;
producing corresponding model projection images from a generic model of the body;
comparing the at least one body projection image and the model projection images from the generic body model;
adjusting the generic model to the body based on the comparing of the at least one body projection image and the model projection images, wherein adjusting the generic model to the body includes comparing image contents of the at least one body projection image with the model projection images; and
determining the three-dimensional form of the body from the adjusted generic model;
wherein comparing the image contents of the at least one body projection image and the model projection images includes comparing (i) outer contours of the projection images and (ii) features of the projection images in the interior of the outer contours.

14. A device for determining a three-dimensional form of a body from two-dimensional projection images, said device comprising:
an image forming device which produces at least one projection image of the body; and
a computer-assisted data and/or image processing device which produces model projection images corresponding to the at least one body projection image from a generic model of the body, wherein the at least one body projection image and the model projection images are inputted into the data and/or image processing device using a data transfer means, said data and/or image processing device including:
a component for adjusting the generic model to the body, wherein the form and, if necessary, the position of the generic model is adjusted, and wherein the match between the generic model and the body is determined at the two-dimensional level by comparing the image contents of the at least one body projection image with the model projection images, wherein comparing the image contents of the at least one body projection image and the model projection images includes comparing (i) outer contours of the projection images and (ii) depth information in the projection images, wherein depth information includes features in the interior of the outer contours of the projection images; and
a component for determining the three-dimensional form of the body from the adjusted generic model.

15. The device as set forth in claim 14, wherein the image forming device is a digital x-ray device.

16. A method for determining a three dimensional form of an anatomical body from two dimensional projection images, said method comprising:
receiving at least one projection image of the body;
producing model projection images from a generic model of the body, the model projection images corresponding to the at least one body projection image;
adjusting a form of the generic model to the body based on the at least one body projection image and the model projection images by comparing (i) outer contours of the projection images and (ii) depth information in the projection images, wherein depth information includes features in the interior of the outer contours of the projection images; and
determining the three dimensional form of the body from the adjusted generic model.

* * * * *